Figures 5, 6:
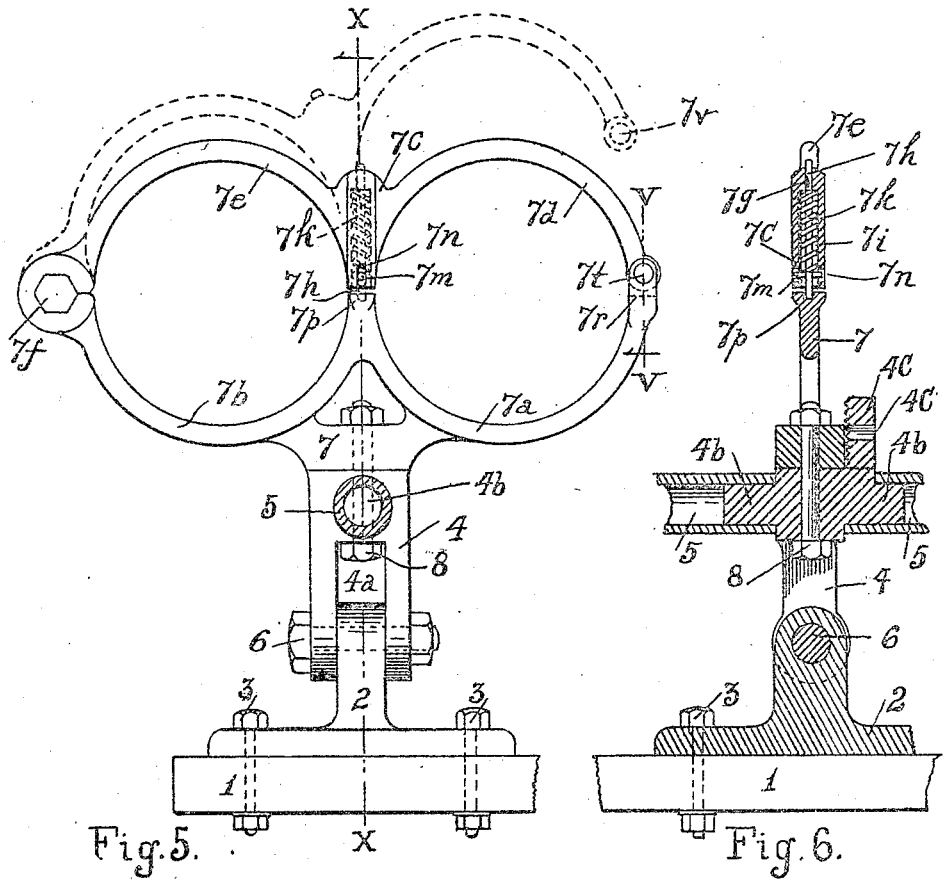

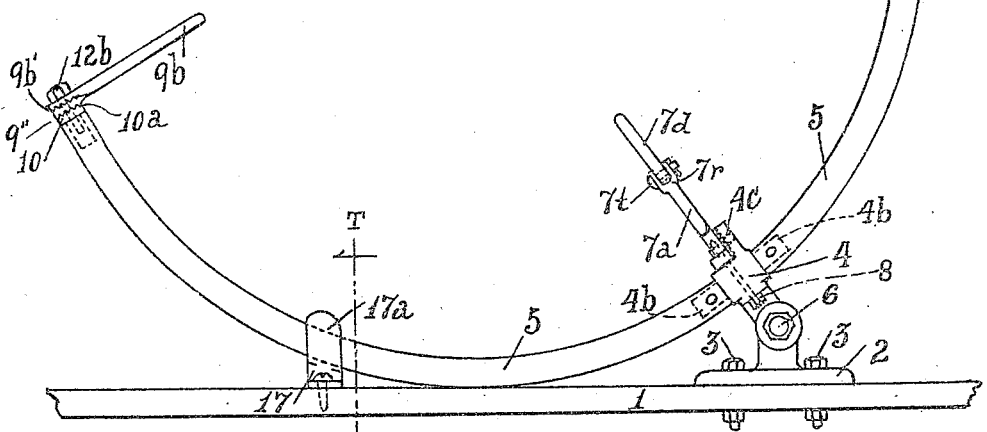
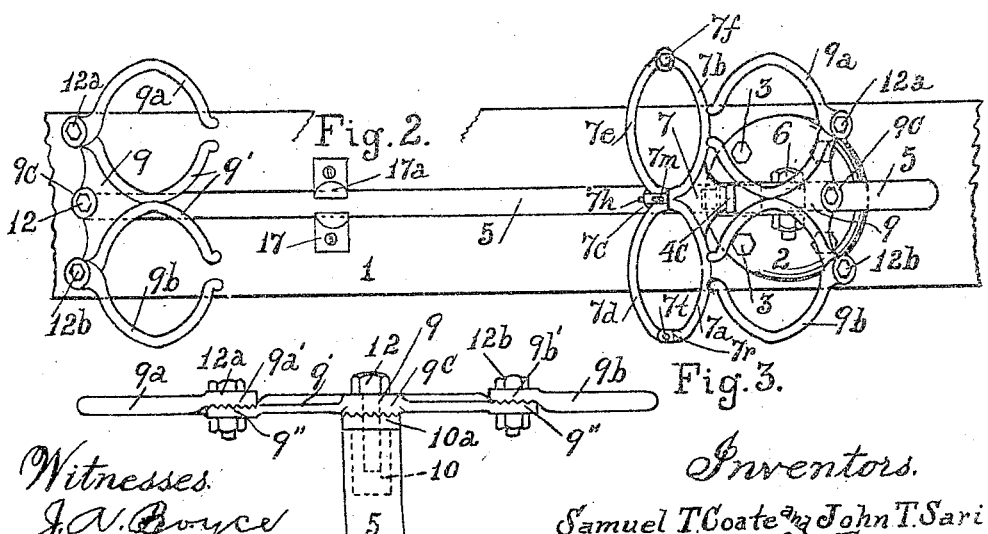

Witnesses.
J. A. Boyce.

Inventors.
Samuel T. Coate and John T. Saris.
By Atty. N. DuBois.

S. T. COATE & J. T. SARIS.
TIRE SUPPORTER.
APPLICATION FILED DEC. 24, 1908.

943,341.

Patented Dec. 14, 1909.
4 SHEETS—SHEET 3.

Witnesses.
J. A. Boyce
W. F. Hemphill

Inventors.
Samuel T. Coate & John T. Saris.
By Atty N. DuBois.

S. T. COATE & J. T. SARIS.
TIRE SUPPORTER.
APPLICATION FILED DEC. 24, 1908.

943,341.

Patented Dec. 14, 1909.
4 SHEETS—SHEET 4.

Witnesses.
J. V. Boyce
A. F. Hemphill

Inventors.
Samuel T. Coate and John T. Saris.
By Atty N. DuBois.

UNITED STATES PATENT OFFICE.

SAMUEL T. COATE AND JOHN T. SARIS, OF SPRINGFIELD, ILLINOIS.

TIRE-SUPPORTER.

943,341.

Specification of Letters Patent. Patented Dec. 14, 1909.

Application filed December 24, 1908. Serial No. 469,135.

*To all whom it may concern:*

Be it known that we, SAMUEL T. COATE and JOHN T. SARIS, citizens of the United States, residing at Springfield, in the county of Sangamon and State of Illinois, have invented a new and useful Tire-Supporter, of which the following is a specification.

This invention relates to an improvement in tire holders for automobiles, to hold spare tires where they will be readily accessible for use in case of emergency; and comprises means for readily and securely connecting the tire supporter with the running-board of the automobile so that the tire holder may be easily and quickly turned on its support, so as not to interfere with getting on or off the vehicle. It also comprises interchangeable tire holders adapting the tire supporter to carry one tire or two tires as the user may elect; and other novel features of construction shown in the drawings and hereinafter described and claimed.

The invention is illustrated in the annexed drawings, to which reference is hereby made and is hereinafter particularly described and finally recited in the claims.

Similar reference numerals and characters designate like parts in the several views.

Figure 4:
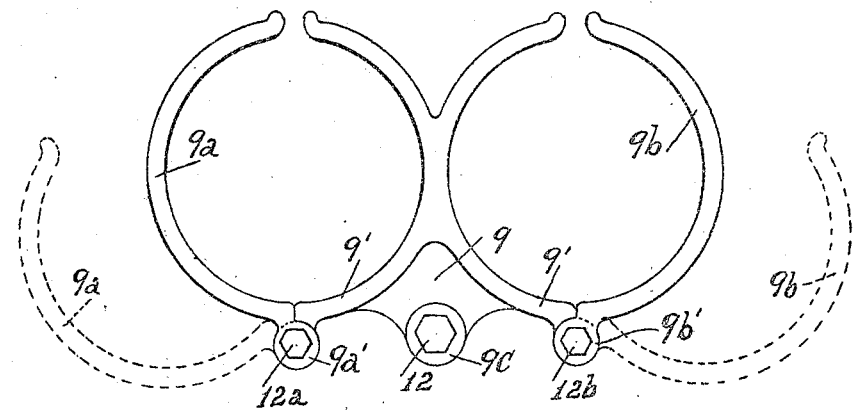
Figure 7:
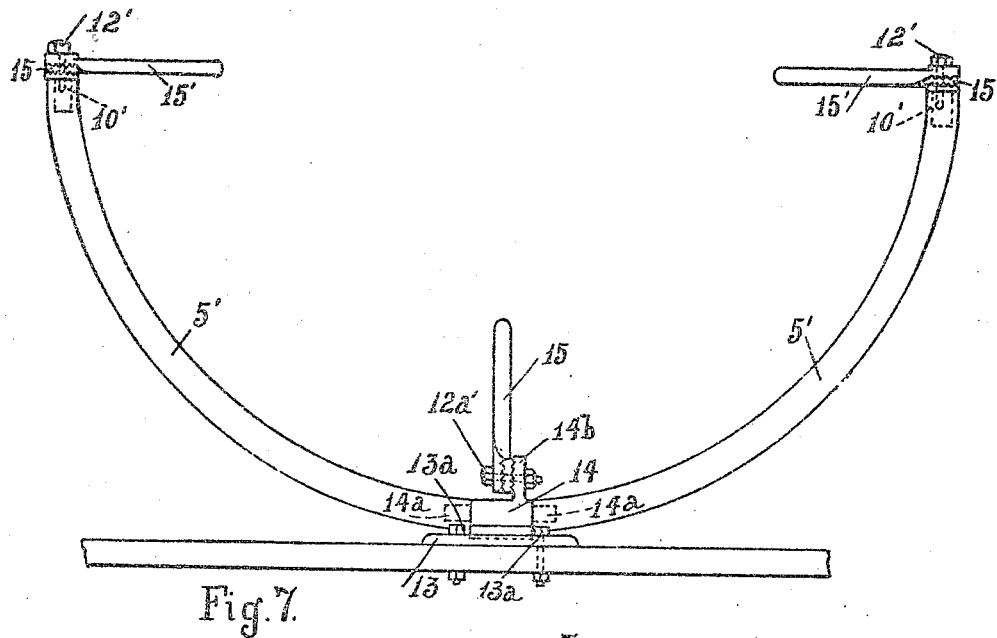
Figure 8:
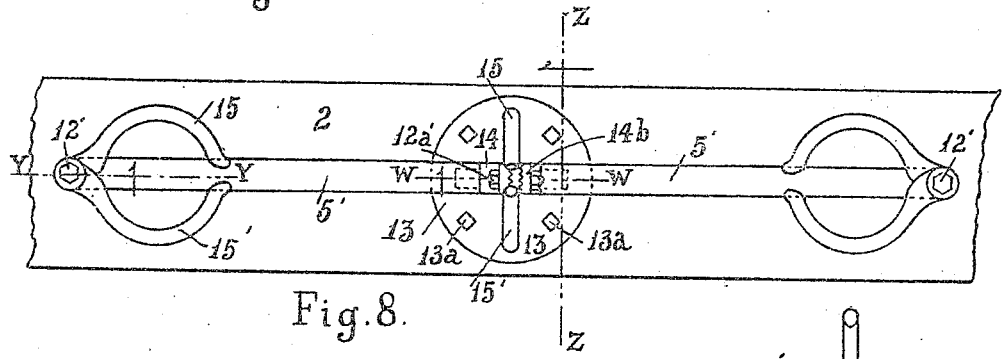
Figure 9:
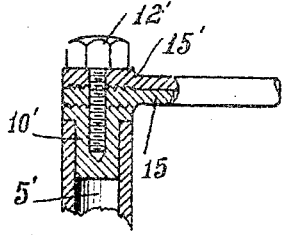
Figures 10, 11:
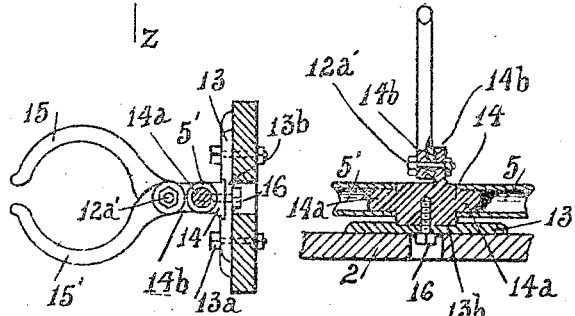
Figure 12:
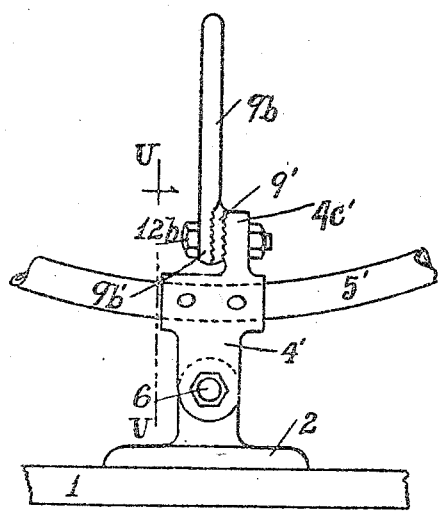
Figure 13:
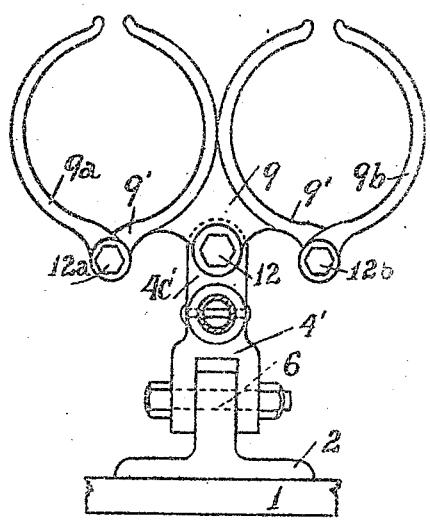
Figure 14:
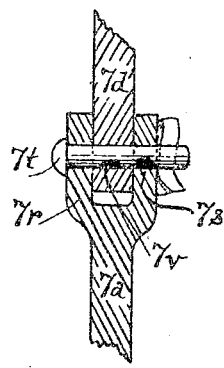
Figure 15:
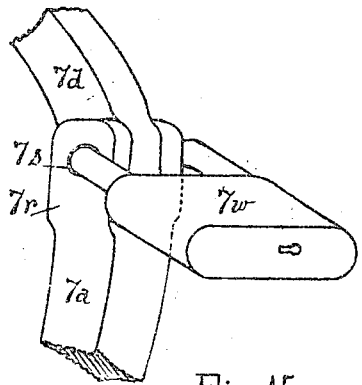

Figures 1 and 2 are respectively a side elevation and top plan of a tire supporter of the preferable form; Fig. 3 is an enlarged elevation of one end of the tire supporter: Fig. 4 is an enlarged side elevation of a pair of forks at one end of the tire supporter, and shows in dotted lines the changed positions of the outer prongs or tines of the fork: Fig. 5 is an enlarged elevation of the central pair of forks and the standard supporting the arch and shows in dotted lines the changed position of the hinged member of the forks: Fig. 6 is a vertical section on the line X. X. of Fig. 5: Figs. 7 and 8 are respectively a side elevation and top plan of a tire supporter of modified construction: Fig. 9 is an enlarged vertical section on the line Y. Y. of Fig. 8: Fig. 10 is a vertical transverse section on the line Z. Z. of Fig. 8: Fig. 11 is a partial vertical longitudinal section on the line W. W. of Fig. 8: Fig. 12 is an enlarged side elevation, showing an arch and hinge block of modified construction, and an alternative connection of the central double fork with the hinge block. Fig. 13 is a vertical transverse section on the line U. U. of Fig. 12: Fig. 14 is an enlarged vertical section on the line V. V. of Fig. 5;

Fig. 15 is an enlarged isometric projection illustrating modified means for connecting the members of the central double fork, and Fig. 16 is an enlarged vertical section on the line T. T. of Fig. 1.

The tire supporter of the preferable form shown in Figs. 1 to 6 inclusive is adapted to support two tires, and is connected with the running board of the vehicle in such manner that the arch on which the tires are mounted may be turned in one direction, (in this case to the right) to clear the entrance to the vehicle, so as not to interfere with the opening or closing of the door and so as not to obstruct entrance to or exit from the vehicle. A tire supporter adapted to support a single tire and having a stationary arch equipped with removable and adjustable forks as shown in Figs. 7 to 11 inclusive is within the scope of our invention; and it is obvious that either the swinging arch shown in Fig. 1, or the stationary arch shown in Fig. 7 may be equipped with either single forks or double forks, without departure from our invention.

The tire supporter of preferable construction will first be described and then the tire supporter of modified construction will be described. The tire supporter is located on the running board 1 of the vehicle, (not shown) and has no connection whatever with the body of the vehicle; there is therefore no necessity for defacing the vehicle body with connecting devices of any kind and no danger of marring or breaking vehicle body in case of the breaking or accidental detaching of the tire supporter. A standard 2 is secured on the running-board 1, by bolts 3 or equivalent securing devices. A hinge block 4 has a fork 4ª (Fig. 5) in which the upper part of the standard 2 fits, and also has integral plugs 4ᵇ fitting tightly in the adjacent ends of the tubular arch sections 5, and the arch sections are riveted or otherwise suitably secured on the plugs 4ᵇ. The hinge block 4 also has an integral vertical member 4ᶜ serrated on one face and pierced by a hole 4ᶜ′ (Fig. 6) adapted to receive a horizontal bolt for connecting with the block the double fork shown in Fig. 4, as hereinafter described. We prefer to use arch sections as described, and the means described for firmly connecting the arch sections with the hinge block, but it is obvious that, without departure from our invention, a continuous arch in a single piece, may be -used, and it may be connected in any suitable manner with the hinge block; for example as illustrated in Figs. 12 and 13, in which a continuous arch 5' is shown as connected with a hinge block 4' of modified construction, and a double fork of the form illustrated in Fig. 4 is shown connected with the hinge block. A bolt 6 pivotally connects the hinge block 4 with the standard 2. The lower stationary fork-member of the central fork, Figs. 5 and 6, comprises a central basal part 7 and laterally extending integral arms $7^a$ and $7^b$ of approximately semi-circular form. A bolt 8 connects the lower fork-member with the hinge block 4, so that by unscrewing the nut on the bolt the fork-member may be detached from the hinge block.

The double forks shown in Figs. 1, 2, 4 and 5, and the single fork shown in Figs. 7–11 are interchangeable, in order that if it be desired to carry two tires the double forks may be connected with the arch; and if it be desired to carry one tire the double forks may be detached from the arch and the single forks may be connected with the same arch by the same bolts that were used to connect the double forks with the arch. In practice a set of double forks and a set of single forks may be furnished with each arch, so that the user may equip the tire supporter to carry two tires or one tire, as he may elect. The upper member of the central double fork comprises a central part $7^c$, and integral laterally extending semi-circular arms $7^d$ and $7^e$, respectively complemental to the arms $7^a$ and $7^b$ of the lower or stationary fork member. A bolt $7^f$ forms a pivotal connection of the upper fork-member with the lower fork-member. The part $7^c$ has a vertical hole $7^g$ accommodating a slidable pin $7^h$ and also has a chamber $7^i$ housing a spring $7^k$ surrounding the pin $7^h$. A pin $7^m$ extends transversely through the pin $7^h$ and travels in suitable vertical slots $7^n$ in the walls of the part $7^c$. The spring $7^k$ acts on the pin $7^m$ to slide the pin $7^h$ downward. In the upper end of the part 7 of the lower fork-member is a recess $7^p$ in line with the pin $7^h$ and accommodating the lower end of said pin. At the outer end of the arm $7^a$ is a fork $7^r$ having in its members transverse holes $7^s$ accommodating a pin $7^t$ or equivalent connecting device, substantially as shown in Fig. 14. At the outer end of the arm $7^d$ is an eye $7^v$ to receive the connecting device $7^t$ connecting the arms $7^a$ and $7^d$.

We have shown and described a pin $7^t$ connecting the arms $7^a$ and $7^d$ but they may be connected by any other suitable connecting device such as a lock $7^w$ having a hasp extending through the holes $7^s$ of the members $7^r$ and through the eye of the arm $7^d$, as shown in Fig. 15. When the arms $7^a$ and $7^d$ are connected as described, the spring $7^k$ acts to press the end of the pin $7^h$ into the recess $7^p$ and also acts to raise the upper member of the fork to cause the arm $7^d$ to pull on the connecting devices $7^t$ and $7^t$ to keep the connections taut so as to prevent rattling. Plugs 10 are brazed in the upper ends of the pipe sections 5 and have at their upper ends serrations $10^a$. The upper double forks (Figs. 3 and 4) are both alike so a description of one will suffice for both. The central stationary member 9 of the upper double fork has a hub $9^c$ having serrations matching the serrations on the upper surface of the plugs 10 and also has branches 9' having serrated hubs 9''. Arms $9^a$ and $9^b$ approximately semi-circular in form, have serrated hubs $9^{a'}$ and $9^{b'}$ respectively matching the serrated hubs 9'' of the branches 9'. Bolts $12^a$ and $12^b$ connect the arms $9^a$ and $9^b$ with the branches 9' respectively. By loosening the nuts on the bolts $12^a$ and $12^b$ the arms $9^a$ and $9^b$ may be turned outward as indicated by dotted lines in Fig. 4, to permit the placing of tires in the forks, and when the tires are properly placed the arms may be turned back to their original position and the nuts may be tightened to secure them in place.

The tire supporter having a swinging arch equipped with double forks or single forks as the case may be having been described, the tire supporter of modified construction shown in Figs. 7–11 and having a fixed arch adapted to be equipped with either single or double forks will now be described. The arch sections 5', the plugs 10', and the bolts 12' and $12^{a'}$ are exactly the same as the sections 5, the plugs 10 and the bolts 12 and $12^a$ already described. The base plate 13 is secured on the running board 1 by bolts $13^a$ and has a central depression $13^b$ in which the lower end of the block 14 fits. The block 14 has plugs $14^a$ brazed in the ends of the pipe sections 5', and an integral vertical member $14^b$ having a serrated face. A screw bolt 16 (Fig. 11) extends through the base plate 13 and screws into the block 14 to firmly connect the block with the base plate. Each of the forks consists of an approximately semi-circular arm 15 and a similar complemental arm 15' connected together as described. The arm 15 has a hub serrated on both sides and the arm 15' has a hub serrated on one side. The serrations on one side of the hub of the arm 15 match the serrations on the plugs 10', or the serrations on the member $14^b$ of the block 14, as the case may be; and the serrations on the other side of the hub of the arm 15 match the serrations on the hub of the arm 15'. Screw bolts 12' connect the arms 15 and 15' of the upper forks with the plugs 10' and a bolt $12^{a'}$ connects the arms 15 and 15', of the central fork with each other and with the member 14$^b$. The serrations on the arms 15 and the serrations on the member 14$^b$ are exactly like the serrations on the hub 9$^c$ of the member 9 of the double fork shown in Fig. 3.

If it be desired to substitute for the single forks shown in Figs. 7 and 8, the double forks shown in Figs. 3 and 4, the bolts 12' will be unscrewed and the arms 15 and 15' will be removed from the plugs 10, and the bolt 12$^{a'}$ will be withdrawn and the arms removed from the member 14$^b$: the double forks (Figs. 3 and 4) will then be placed on the plugs 10' and the member 14$^b$ with the serrations of the hubs 9$^c$ in mesh with the serrations of the plugs 10' and the member 14$^b$ respectively; the screw bolts 12' will be inserted and screwed down to secure the upper forks in place, and the bolt 12$^{a'}$ will be inserted and the nut screwed thereon to secure the central double fork on the member 14$^b$. In like manner the single forks shown in Figs. 7–11 may be substituted for the double forks of the swinging arch shown in Figs. 1–6. The swinging arch may be placed on the running-board adjacent to the door of the vehicle and may be swung to the right so as not to interfere with the opening of the door. A harp shaped latch 17 having springy jaws 17$^a$ conforming to the contour of the arch is secured on the running-board in line with and directly under the arch. When the arch occupies the position shown in Fig. 1 the jaws 17$^a$ grasp the arch and hold it tight enough to prevent accidental turning of the arch, but yield to release the arch when it is moved by hand.

A prime feature of this improvement is that the tire supporter is connected with the foot board only and has no direct connection with the vehicle body and may be quickly and easily placed on or removed from the foot board.

Having fully described our invention, what we claim as new and desire to secure by Letters Patent is:

1. In a tire supporter, the combination of a base, a block pivotally mounted on said base, a tire holder mounted on said block, an arch fixed on said block, and tire holders mounted on said arch.

2. In a tire supporter, the combination of a standard, a hinge block pivotally supported on said standard, an arch-section secured on said hinge block, a tire holder detachably connected with said hinge block, and tire holders detachably connected with said arch-section respectively.

3. In a tire holder, the combination of a stationary member having branching arms, a movable member having branching arms complemental to the arms of said stationary member, means pivotally connecting one arm of said movable member with one arm of said stationary member, detachable means for connecting the free ends of said members, and means adapted to press said members apart to prevent rattling.

4. The combination of a main structure, a vertical member fixed on the main structure and having a serrated face and a transverse hole, a tire holder having serrations matching the serrations on said vertical member, and a connecting device fitting the hole in said vertical member and connecting said tire holder with said vertical member.

5. In a tire supporter, the combination of a base attachable to the running board of the vehicle, a main structure having a hinge connection with said base and adapted to turn in a plane parallel to the side of the vehicle on which the tire supporter is mounted, and adjustable tire holders on said tire supporting structure adapted to support a plurality of tires parallel to the vehicle body.

6. In a tire supporter, the combination of a base attachable to the running board of a vehicle, a main structure having a hinge connection with said base, tire holders mounted in parallel on said main structure and having movable arms adapted to clasp tires supported side by side on said arms and means for securing the arms of said tire holders respectively.

7. In a tire supporter, the combination of a base attachable to the running board of a vehicle, a main structure having a hinge connection with said base and adapted to turn in a plane parallel to the vehicle body and equipped with means for holding a tire, and a latch adapted to prevent accidental upward turning of said main structure on its hinge also adapted to prevent lateral displacement of said main structure.

8. In a tire supporter, the combination of a main structure, a stationary tire holder member mounted on said main structure, a movable tire holder member having a hinge connection with said stationary tire holder member, a connecting device adapted to connect the free ends of said tire holder members and spring actuated means adapted to cause said movable tire holder member to pull on the connecting device connecting it with said stationary tire holder member.

In witness whereof we have hereunto subscribed our names, at Springfield, Illinois, this 2d day of December, 1908.

SAMUEL T. COATE.
JOHN T. SARIS.

Witnesses:
O. D. Du Bois,
J. Ernest Caldwell.